(No Model.)
O. STROBERGER.
CIGAR GLOSSING DEVICE.
No. 500,823. Patented July 4, 1893.
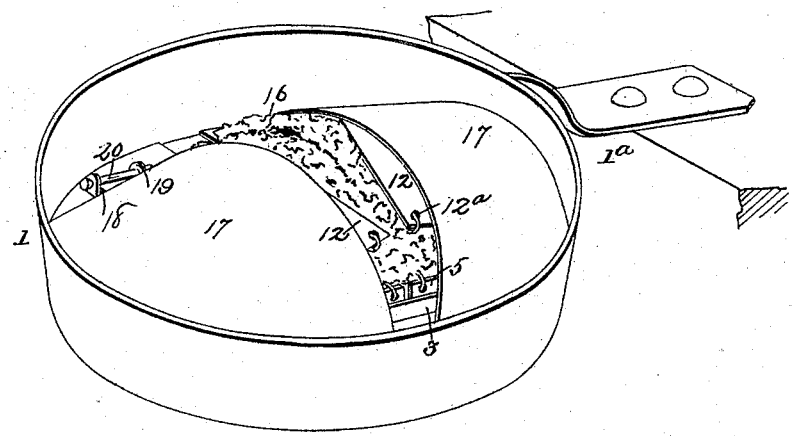
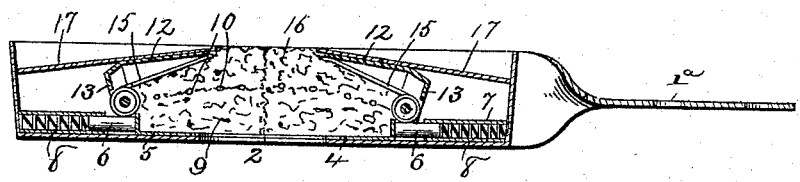
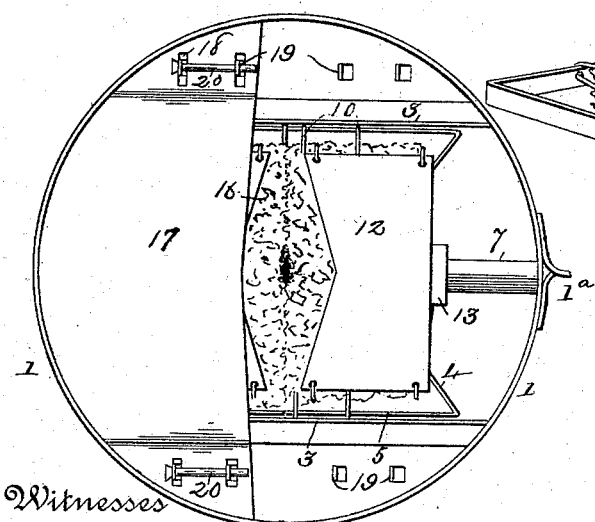
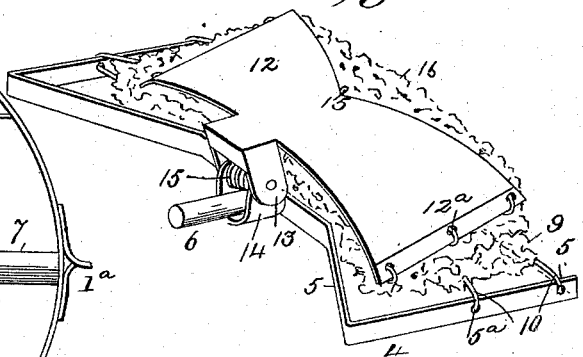
Witnesses
A. J. Schwartz
John Cullen
Inventor
Otto Stroberger.
by J. Fred. Reily
his Attorney

UNITED STATES PATENT OFFICE.

OTTO STROBERGER, OF FARIBAULT, MINNESOTA.

CIGAR-GLOSSING DEVICE.

SPECIFICATION forming part of Letters Patent No. 500,823, dated July 4, 1893.

Application filed May 24, 1892. Serial No. 434,130. (No model.)

*To all whom it may concern:*

Be it known that I, OTTO STROBERGER, a citizen of the United States, residing at Faribault, in the county of Rice and State of Minnesota, have invented certain new and useful Improvements in Cigar-Glossing Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention consists in a new and improved cigar glossing pan, or device, which will effect a great saving in time and labor, and will impart a more uniform and superior finish; and my invention will be hereinafter fully described and claimed.

Referring to the accompanying drawings, Figure 1 is a perspective view of my invention. Fig. 2 is a central vertical sectional view of the same. Fig. 3 is a top plan view with one of the outer covers removed. Fig. 4 is a detail view of one of the movable sponge-holders.

The same numerals of reference indicate corresponding parts in all the figures.

Referring to the several parts by their designating numerals; 1 indicates the pan or outer receptacle, which may be of any desired shape, square, round, or any other suitable form; the pan shown in the drawings being round. In the bottom of this pan, which may be formed of galvanized iron, or any other suitable material, is formed an opening, 2, extending across the center of the pan-bottom. On each side of this opening parallel guide strips, or flanges, 3, 3, are secured, between which the lower sponge-holding plates, 4, 4, fit and slide. The pan is provided with a handle, 1ª, having a hole in its flat outer end to adapt it to be fastened securely to a table or bench; and a sheet is spread beneath the pan to catch the cigars as they pass through the same.

The lower sponge-holding plates 4, 4, are formed with the side and rear edge flanges 5, extending upward as shown; and to the rear end of each of said plates is secured the end of a short rod, 6, the other end of which slides in a tube, 7, secured on the bottom of the pan as shown, and within which a coiled spring, 8, is arranged. It will thus be seen that the two coiled springs 8 will press the plates 4, 4, toward each other, holding the sponges, 9, 9, which are secured in the plates pressed together and in the proper position. These sponges are securely held in the flanged plates 4 by threads or small cords, 10, which pass through the sponges and through apertures 5ª formed in the side-flanges of the plates; thus holding the sponges always in place and at the same time leaving them loose and elastic, so that they will not clog or become hard.

12, 12, indicate the curved upper plates, formed with the bearings 13 at their rear ends, which are pivoted to lugs 14 at the rear ends of the lower plates 4; and springs 15, 15, are arranged as shown in the bearings 13, and operate to normally press the free ends of the upper plates upward. Sponges, 16, 16, are secured in these upper plates by threads or cords passing through them and apertures 12ª in the edges of said plates, in the same manner that the lower sponges are secured.

17, 17, indicate two removable thin metal covers, which flare or incline upward and outward toward their inner ends, as shown; having slots, 18, in their flat ends through which apertured lugs, 19, struck up out of the bottom of the pan, pass, and pins or bolts, 20, are then passed through these apertured lugs to hold the covers in position.

The operation of my invention is as follows:—The sponges are first soaked with the liquid gloss or substance, when the operator takes a cigar and pushes it point downward through, or rather between, the sponges until it is out of sight, and then takes the next cigar and pushes it down in the same place, when it will force the first one through the lower sponges, to drop on the cloth which is arranged beneath; and this is repeated with each cigar. It will be seen that the springs 8 in the tubes 7 will press the springs together around the cigar so as to thoroughly moisten the entire surface of it with the glossing material; while the springs 16 cause the upper pivoted plates 12 with their upper sponges to work upward so that the pressure between them is looser than that between the lower sponges, while they remain in the proper position to moisten or coat the cigar passing between them; and there is thus no danger of the cigars being torn or injured while being pushed through the sponges, owing to this arrangement. The covers 17 permit the upper sponge-plates to work up and down on their pivots, and prevent them from flying back too far as they are released from the downward pressure of each cigar which passes between them. But when it is desired to clean or thoroughly soak the lower sponges, the bolts 20 are withdrawn and the covers can be readily raised, enabling the sponges to be easily reached. The covers also shield the sponges and the interior of the device from dust and from being disturbed or injured. As the lower springs 8 force the lower and upper plates forward, together, the springs 16 force the upper plates upward at their free ends, as will be readily seen; the upward slope of the covers admitting of this movement of the upper plates. It will be seen that the cigars can be passed rapidly through the sponges one after the other, each pushing the preceding one clear of the lower sponges; and I have found by actual trial that a boy of ten can gloss from five thousand to seven thousand cigars a day and do uniform work.

Having thus described my invention, what I claim, and desire to secure by Letters Patent, is—

1. In a cigar glossing device, the combination, of a pan or receptacle formed with a central bottom-opening, two sliding sponge-holders arranged on each side of said opening, and springs pressing the said sliding holders toward each other; substantially as set forth.

2. The combination, of the pan formed with the central bottom opening, and having the guide-strips 3, the sliding plates having the sponges secured in them, and the spring-actuated rods secured to said plates; substantially as set forth.

3. The combination of the pan formed with the central bottom opening, and having the guide-strips 3, the sliding plates 4 having the sponges secured in them and having springs arranged to slide them toward each other, the curved upper plates, 12, having the sponges secured in them and hinged at their rear ends on the lower plates 4, springs arranged to press the free ends of plates 12 upward, and stop-pieces limiting the upward movement of said plates; substantially as set forth.

4. The combination of the pan formed with the central bottom opening and having the guide-strips, 3, and the tubes 7, the sliding plates 4 having sponges secured in them and having the projecting rods 6 fitting in the tubes 7, the spiral springs arranged in the said tubes, the upper plates 12 having the sponges secured in them and hinged at their rear ends to the lower plates 4, the springs 15 arranged as shown to press the free ends of the upper plates upward, and the removable inclined covers 17; substantially as set forth.

In testimony whereof I affix my signature in presence of two witnesses.

OTTO STROBERGER.

Witnesses:
JOSEPH KASPER,
THOS. H. QUINN.